Patented May 22, 1923.

1,456,495

UNITED STATES PATENT OFFICE.

SVEN EMIL SIEURIN, OF HOGANAS, SWEDEN, ASSIGNOR TO HÖGANÄS BILLESHOLMS AKTIEBOLAG, OF HELSINBORG, SWEDEN, A COMPANY LIMITED.

MANUFACTURE OF CARBON ELECTRODES.

No Drawing. Application filed July 31, 1920. Serial No. 400,515.

*To all whom it may concern:*

Be it known that I, SVEN EMIL SIEURIN, a subject of the King of Sweden, residing at Hoganas, Sweden, have invented new and useful Improvements in Manufacture of Carbon Electrodes (for which applications for patent have been filed in Sweden, #2927, August 3, 1918; Great Britain, #21051, July 12, 1920, Patent #170,106; Germany, #81784, July 14, 1920, Patent #353,285; Switzerland, #7308, July 16, 1920, Patent #90,179; Norway, #21387, July 23, 1920, Patent #34,459), of which the following is a specification.

Carbon electrodes, as heretofore manufactured, are usually produced by moulding a plastic mass of tar or pitch and powdered carbon, such as anthracite, graphite or the like, and burning the bodies thus formed without admission of air. For that purpose these bodies are enclosed in casings, usually of chamotté, which are heated from the outside by means of generator gases. During the first period of the heating, which is known as the gasification period, the tar products are distilled off, while the second period, known as the calcination period, has for its purpose to transfer the electrodes into solid carbon blocks of a good conductivity. During the first period the volatile hydrocarbons escape through the porous walls of the casing to the outside thereof, where they are immediately burned, the tar thus essentially serving as a combustible, whereby the manufacture of the electrodes is rendered very expensive.

This invention relates to an improved process of this character, and has for its object to more perfectly utilize the volatile hydrocarbons, partly in an improved form. The process consists in enclosing the moulded bodies or electrodes, either singly or a number together in gas-tight containers provided with outlets for the tar gas, said containers being formed of cast iron or forged iron or any other suitable material. The container may be encased with chamotté or the like for protection against oxidation. Between the electrodes, if several are enclosed in the container and between them and the wall of the container there is placed a layer of a porous or coarse grained material, for instance, sand, carbon, powder, or chamotté, for permitting the passage of the tar gases to the outlets of the container and enclosing the electrodes more or less completely.

The containers are heated either externally or from within by means of an electric current, conducted through the metallic container or through electric resistances arranged in or around the electrodes. The tar gases, formed by the heating, escape through the outlet or outlets of the container and are conducted to a condensing apparatus in which—if the heating has been carefully performed—one or several different fractions are obtainable, corresponding to the different products, which result from the usual distillation of tar.

As these products of distillation are more valuable than the tar, an essential saving of the cost of manufacture of the electrodes is obtained in this manner.

After the end of the process, the electrodes are removed from the container and finished by burning in the usual manner or in an electric furnace.

Having now particularly described the nature of my invention and the manner of its operation, what I claim is:

1. The process of manufacturing electrodes from a moulded mass of tar and carbon powder which consists in introducing and heating the bodies in gas-tight containers provided with outlets, condensing the escaping tar gases, and after the escape of the said gases removing the bodies from the container and exposing them to a finishing burning.

2. The process of manufacturing electrodes in the manner specified in claim 1, the heating in the container being accomplished by means of exterior heating, and the finishing burning by means of electricity.

3. The process of manufacturing electrodes in the manner specified in claim 1, the heating being accomplished by means of electricity.

In testimony whereof I have signed my name to this specification.

SVEN EMIL SIEURIN.